United States Patent [19]
Eilingsfeld et al.

[11] 3,737,449
[45] June 5, 1973

[54] PRODUCTION OF HYDROXYBENZONITRILES

[75] Inventors: Heinz Eilingsfeld, Frankenthal; Horst Scheuermann, Ludwigshafen, both of Germany

[73] Assignee: Badische Anilin- & Soda-Fabrik Akteingesellschaft, Ludwigshafen am Rhineland, Germany

[22] Filed: June 18, 1970

[21] Appl. No.: 47,579

[30] Foreign Application Priority Data
July 2, 1969 Germany............P 19 33 525.2

[52] U.S. Cl. ........260/465 D, 260/465 E, 260/465 F, 260/465 G
[51] Int. Cl. ................C07c 121/74, C07c 121/78
[58] Field of Search..................260/465 F, 623 R, 260/629, 465 D, 465 E

[56] References Cited
UNITED STATES PATENTS
3,481,991  12/1969  Cohen..................260/623

OTHER PUBLICATIONS
Dokunikhin et al.: Chemical Abstracts, Vol. 70, p. 60, (1969).

Primary Examiner—Lewis Gotts
Assistant Examiner—Dolph H. Torrence
Attorney—Johnston, Root, O'Keeffe, Keil, Thompson & Shurtleff

[57] ABSTRACT

Production of chlorine- and/or cyano-substituted hydroxybenzonitriles or their alkali or alkaline earth metal salts by reacting chlorobenzonitriles with alkali or alkaline earth metal nitrites and optionally converting the salts to the hydroxy compound by acidification. The products are intermediates in the manufacture of dyes and plant protection agents.

5 Claims, No Drawings

PRODUCTION OF HYDROXYBENZONITRILES

This invention relates to a new process for the production of chlorine- and/or cyano-substituted hydroxybenzonitriles or their alkali or alkaline earth metal salts of the general formula

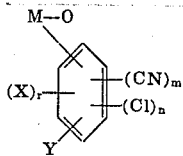

I in which M stands for hydrogen or alkali cations or the equivalent of alkaline earth cations, X stands for hydrogen, chlorine or a cyano group and Y stands for hydrogen, chlorine, a cyano group or an alkoxy, aryloxy, alkylmercapto, arylmercapto, dialkylamino or alkylarylamino group, and in which $m = 1$ or 2, $n = (2-m)$ and $r = 1$ or 2.

We have now found that these compounds, which are valuable in the synthesis of dyes and plant protection agents, may be obtained in a remarkable reaction comprising the interreaction of chlorobenzonitriles of the general formula

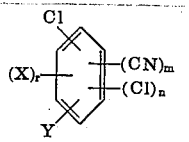

II with an alkali or alkaline earth metal nitrite optionally followed by the conversion of the resulting salts of formula I to the free hydroxy compounds by acidification.

This interreaction, which may be represented by the following equation

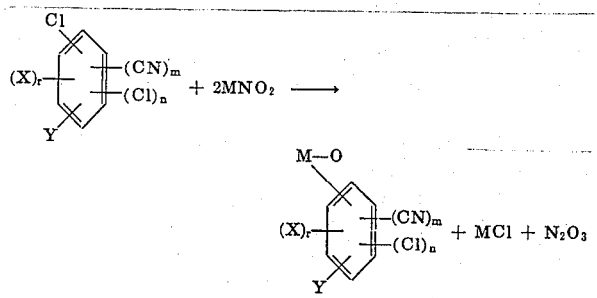

may also be generally referred to as a method of replacing chlorine by a hydroxy group in benzonitrile derivatives of the type represented by formula II.

Generally, if the starting material of formula II contains a number of chlorine atom and a cyano group, the substitution preferentially takes place first at the p-chlorine atom, then at the o-chlorine atom and finally at the m-chlorine atom. If, in addition, a number of cyano groups or any of the other substituents given for Y in the above definition are present, the same general rule applies, that is, that chlorine atom is most reactive which is most frequently in the $p$ or $o$ position to the other electronegative substituents.

When the chlorine atoms show similar reactivities, the corresponding isomer mixtures of hydroxybenzonitriles of formula I are obtained.

As examples of the starting materials of formula II there may be mentioned:
the dichlorobenzonitriles,
the trichlorobenzonitriles,
the tetrachlorobenzonitriles,
pentachlorobenzonitrile,
4-methylmercapto tetrachlorobenzonitrile,
4-phenylmercapto tetrachlorobenzonitrile,
4-methylphenylamino tetrachlorobenzonitrile,
4-($\beta$-carbomethoxyethyl)phenyl tetrachlorobenzonitrile,
the monochlorophthalonitriles,
the monochloro-isophthalonitriles,
monochloroterephthalonitrile,
the dichlorophthalonitriles,
the dichloro-isophthalonitriles,
the dichloroterephthalonitriles,
the trichlorophthalonitriles,
the trichloro-isophthalonitriles,
trichloroterephthalonitrile,
tetrachlorophthalonitrile,
tetrachloro-isophthalonitrile and
tetrachloroterephthalonitrile.

Where Y stands for one of the other substituents mentioned, this substituent may in turn carry halogen, alkoxy or carboalkoxy groups. The aryl group is preferably a phenyl group and the preferred alkyl groups are those containing from one to four carbon atoms.

In other respects, the success of the process of the invention is largely independent of the particular starting material of formula II used, provided that the chlorine atom to be substituted is activated by at least two of the strongly electronegative substituents cyano and/or chlorine, as expressed in the general formula II.

According to the reaction equation 2 moles of the nitrite (sodium nitrite and potassium nitrite being preferred) are required per mole of the compound of formula II, although it is convenient to use an excess of up to 5 moles of nitrite to ensure rapid and complete conversion.

Depending on the reactivity of the starting material of formula II, the reaction is carried out at a temperature between $-20°$ and $+150°C$, usually at atmospheric pressure and preferably in a polar solvent such as dimethyl formamide, dimethyl sulfoxide, N-methyl pyrrolidone, hexamethyl phosphoric acid triamide, acetonitrile, nitrobenzene, chlorobenzene or dichlorobenzene, alcohols or glycols.

The interreaction is complete when the evolution of nitrogen peroxide from the reaction mixture ceases. The products are initially in the form of a mixture of salts and may be directly used as such in a large number of further reactions. The free hydroxyl compounds may be obtained in the usual manner by acidifying aqueous solutions of the salts to cause precipitation of the hydroxyl compounds.

The process of the invention makes the compounds of formula I, which have hitherto been very difficult to prepare, readily available in a simple and economic manner. These compounds are valuable intermediates in the synthesis of dyes and plant protection agents.

EXAMPLE 1

50 g (0.31 moles) of 4-chlorophthalonitrile and 150 g (2.17 moles) of sodium nitrite in 150 g of dimethyl sulfoxide are heated at 120° C for 3 hours. The mixture is then poured into 1,500 ml of water and the impurities are filtered off. The 4-hydroxyphthalonitrile is then precipitated out with sulfuric acid. The yield is 60 percent and the melting point of the product is 200°–203°C.

EXAMPLE 2

To a mixture of 266 g (1 mole) of tetrachlorophthalonitrile and 1,000 g of dimethyl sulfoxide there are added 532 g (7.7 moles) of sodium nitrite portionwise at 70°–80°C. The mixture is heated at 120°C for 2 hours and then poured into 6 l of water.

The pH of the solution is then adjusted to 8–9 with sodium hydroxide solution and the impurities are filtered off. 4-Hydroxy trichlorophthalonitrile is precipitated out with concentrated hydrochloric acid.

The yield is 76 percent and the melting point of the product is 257°–258°C.

EXAMPLE 3

A mixture of 276 g (1 mole) of pentachlorobenzonitrile and 1,200 g of dimethyl sulfoxide is heated together with 552 g (8 moles) of sodium nitrite at 60°–70°C and then for 3 hours at 130°C. The reaction mixture is then worked up as in Example 2. The 4-hydroxytetrachlorobenzonitrile is obtained in 89 percent yield, m.p. 211°–212°C.

EXAMPLE 4

Example 2 is repeated except that 100 g (0.37 mole) of tetrachloro-isophthalonitrile, 500 g of dimethyl formamide and 80 g (1.1 moles) of sodium nitrite are heated at 50°C. The resulting 2-hydroxytrichloro-isophthalonitrile is obtained in 84 percent yield, m.p. 253°C.

What we claim is:

1. A process for the production of a monohydroxy benzonitrile compound which comprises: reacting a chlorobenzo-nitrile selected from the group consisting of a. benzomononitriles having two to four chlorine atoms in the aromatic nucleus,
   b. benzodinitriles having one to three chlorine atoms in the aromatic nucleus and
   c. each of the foregoing nitriles bearing one further substituent aside from hydrogen in the aromatic nucleus selected from the group consisting of chlorine, alkoxy or carboalkoxy of one to four carbon atoms in the alkoxy group, phenyloxy, alkylmercapto of one to four carbon atoms, phenylmercapto and dialkylamino or alkylarylamino of one to four carbon atoms in each alkyl group, with 2 to 5 moles of an alkali or an alkaline earth metal nitrite per mole of said chlorobenzonitrile at a temperature of from −20° to +150°C. and in the presence of a polar solvent until evolution of nitrogen peroxide ceases; and recovering the resulting monohydroxy benzonitrile product from the reaction mixture.

2. A process as claimed in claim 1 wherein the product is recovered as the monohydroxy benzonitrile metal salt.

3. A process as claimed in claim 1 wherein the metal salt of the monohydroxybenzonitrile product is acidified and the free monohydroxybenzonitrile is recovered.

4. A process as claimed in claim 1 wherein said polar solvent is selected from the group consisting of dimethyl formamide, dimethyl sulfoxide, N-methyl pyrolidone, hexamethyl phosphoric acid triamide, acetonitrile, nitrobenzene, chlorobenzene, dichlorobenzene, alcohols and glycols.

5. A process as claimed in claim 1 wherein said nitrite is sodium or potassium nitrite.

* * * * *